United States Patent
Webb (10) Patent No.: US 7,571,384 B1
(45) Date of Patent: Aug. 4, 2009

(54) METHOD AND SYSTEM FOR HANDWRITING RECOGNITION WITH SCROLLING INPUT HISTORY AND IN-PLACE EDITING

(75) Inventor: Russell Y. Webb, San Jose, CA (US)

(73) Assignee: PalmSource, Inc., Sunnyvale, CA (US)

( * ) Notice: Subject to any disclaimer, the term of this patent is extended or adjusted under 35 U.S.C. 154(b) by 527 days.

(21) Appl. No.: 09/872,245

(22) Filed: May 31, 2001

(51) Int. Cl.
*G06N 3/00* (2006.01)
(52) U.S. Cl. ...................................... 715/268
(58) Field of Classification Search ................. 715/541, 715/513, 517, 523, 530, 234, 243, 254, 255, 715/268; 382/187
See application file for complete search history.

(56) References Cited

U.S. PATENT DOCUMENTS

| | | | | |
|---|---|---|---|---|
| 5,528,743 A * | 6/1996 | Tou et al. | ..................... | 715/541 |
| 5,546,538 A * | 8/1996 | Cobbley et al. | ............. | 709/203 |
| 5,583,542 A * | 12/1996 | Capps et al. | ................ | 345/173 |
| 5,583,543 A * | 12/1996 | Takahashi et al. | ........... | 345/173 |
| 5,710,831 A * | 1/1998 | Beernink et al. | ............ | 382/189 |
| 5,760,773 A * | 6/1998 | Berman et al. | .............. | 345/808 |
| 5,889,888 A * | 3/1999 | Marianetti et al. | .......... | 382/187 |
| 5,903,667 A * | 5/1999 | Kuzunuki et al. | ........... | 382/187 |
| 6,088,481 A * | 7/2000 | Okamoto et al. | ............ | 382/189 |
| 6,256,009 B1 * | 7/2001 | Lui et al. | ..................... | 345/684 |
| 6,282,315 B1 * | 8/2001 | Boyer | ........................ | 382/177 |
| 6,408,092 B1 * | 6/2002 | Sites | .......................... | 382/187 |
| 6,452,694 B1 * | 9/2002 | Eisenberg et al. | .......... | 358/1.18 |
| 6,456,740 B1 * | 9/2002 | Carini et al. | ................. | 382/187 |
| 6,459,442 B1 * | 10/2002 | Edwards et al. | ............. | 715/863 |
| 2002/0143831 A1 * | 10/2002 | Bennett | ...................... | 707/538 |

* cited by examiner

*Primary Examiner*—Kyle R Stork
(74) *Attorney, Agent, or Firm*—Berry & Associates P.C.

(57) ABSTRACT

A computer implemented method for a touch screen user interface for a computer system. A first touchscreen area is provided for accepting text input strokes. A second touchscreen area is provided for displaying recognized text from the text input strokes. The text input strokes are displayed in the first touchscreen area. The text input strokes are recognized and the resulting recognized text is displayed in the second touchscreen area. A portion of the recognized text is displayed in the first touchscreen area, wherein the portion of the recognized text is shown as the text input strokes are recognized.

20 Claims, 8 Drawing Sheets

METHOD AND SYSTEM FOR HANDWRITING RECOGNITION WITH SCROLLING INPUT HISTORY AND IN-PLACE EDITING

TECHNICAL FIELD

The present invention relates to a system and method by which computing devices may more easily recognize input from a user. In particular, the present invention relates to a system and method for implementing a handwriting recognition user interface for data entry with a scrolling recognition history and in-place editing.

BACKGROUND ART

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used to implement various Personal Information Device (PID) applications such as an address book, a daily organizer, and electronic notepads.

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,039; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, expense reports, to do lists, or games. PIDs also often include substantial electronic memory for storing such applications as well as data entered by the user. Due to their substantial variety of applications and uses, personal information devices are becoming increasingly widely used.

Since PIDs and other similar palmtop computer systems are very small, keyboards are generally not efficient input devices. For example, PIDs with keyboards have keyboards that are so small that a user cannot touch-type. Furthermore, to use a keyboard a user must either place the PID system down onto a flat surface so the user can type with both hands or hold the PID system with two hands and type with thumbs only.

Instead of using a keyboard, many PIDs employ a stylus and a touchscreen or digitizer pad as an input system. The stylus and touchscreen combination works well for PIDs since the arrangement allows a user to hold the PID system in one hand while writing with the stylus onto the touchscreen with the other hand. For example, to enter a large amount of text, the user employs the stylus with a touchscreen text entry area, using a variety of text input strokes.

Figure 1:
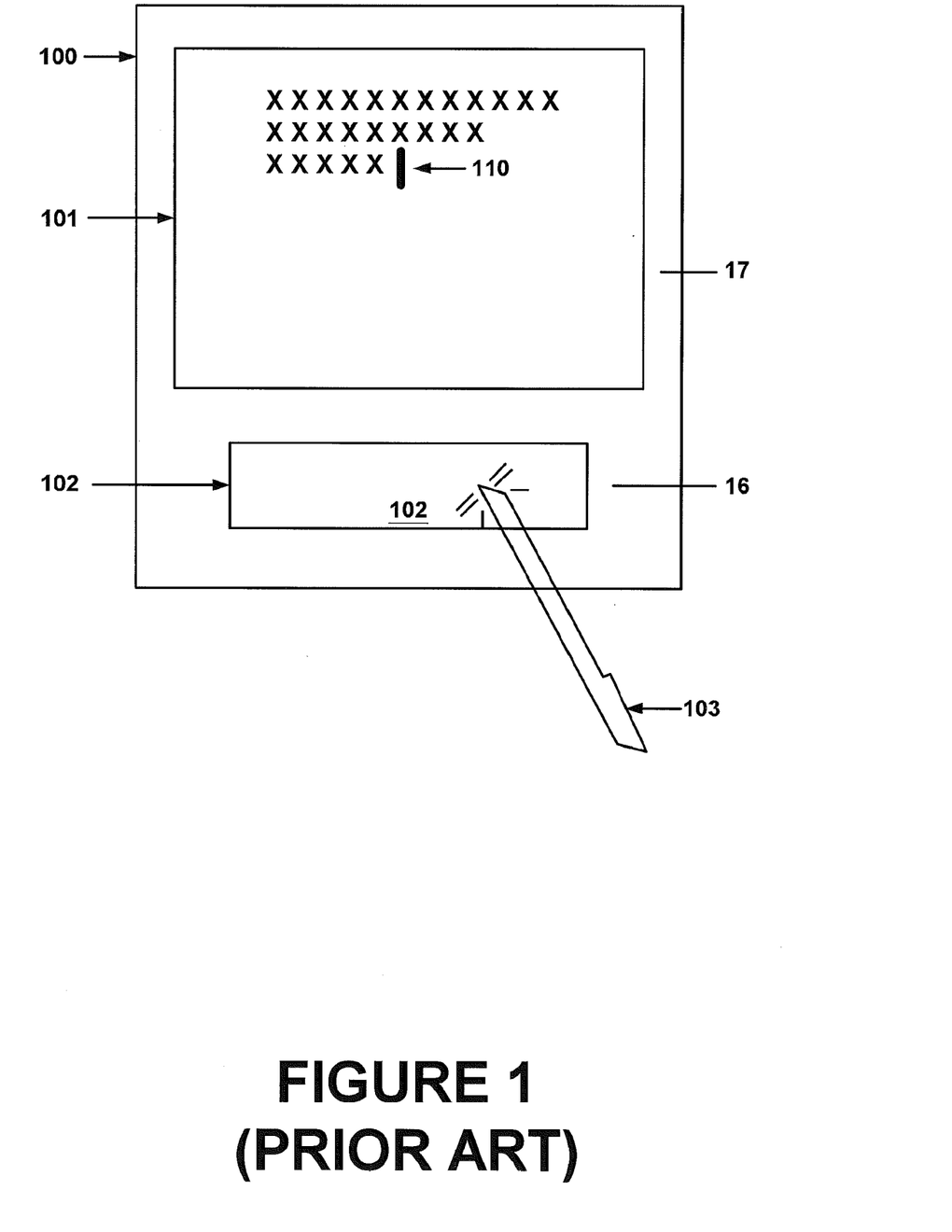
FIG. 1 shows a diagram of a prior art personal information device having a first touchscreen area and a second touchscreen area.

Prior art FIG. 1 shows a diagram of the personal information device 100 having a first touchscreen area 101 and a second touchscreen area 102. Personal information device 100 has two touchscreen areas, touchscreen area 101 configured to recognize touches as the regular use of the stylus 103 as a pointing device from the user, and touchscreen area 102 configured to recognize touches as text input. Touchscreen areas 101-102 are designed to register and recognize strokes from the stylus 103. Typically, touchscreen area 101 is configured as an icon and menu touchscreen display area and the smaller touchscreen area 102 is configured as a text entry area. For example, strokes entered in the icon and menu area (touchscreen area 101) are interpreted as icon and/or menu manipulations and strokes entered in the text entry area (touchscreen area 102) are interpreted as text characters and/or punctuation (e.g., handwriting glyphs and the like). Touchscreen area 101 is generally for displaying large amounts of text (e.g., paragraph or more). Touchscreen area 102 is generally for entering text using input strokes that are recognized as text characters (e.g., graffiti), using, for example, stylus 103.

There are a number of problems with this prior art approach. One problem is the fact that there exists no feedback in the text entry area with regard to the entered strokes and the resulting recognized character. As characters are entered by the user via stylus 103 and touchscreen area 102, there is no feedback within touchscreen area 102 with regard to the particular input strokes of the user or the resulting recognized characters. Recognized characters resulting from input strokes in touchscreen area 102 are displayed in touchscreen area 101, with new characters being entered at an insertion point 110 as they are recognized. This forces the user to divert attention from the touchscreen area 102 as input strokes are entered. For example, to check the accuracy of recognition, the user needs to focus attention on the upper touchscreen area 101. Consequently, the user is constantly looking back and forth between areas 101-102, checking the accuracy of the input strokes as they are being recognized.

Another problem is the fact that there is no easy way to move the insertion point 110 to different locations within the recognized text. As currently implemented in prior art personal information device 100, the text entry point 110 is moved by touching the desired location within the recognized text with stylus 103. There is no easy way to move the insertion point around using the touchscreen area 101. If the insertion point needs to be moved, the stylus must be employed in upper touchscreen area 101, which requires hopping back and forth between areas 101-102 as input strokes are entered.

Another problem is the fact there is no "in-place editing" of the recognized text. In prior art personal information device 100, there is no easy way to edit previously entered text in order to, for example, correct mistakes. To correct a mistake in previously entered text, the user needs to select the mistake using touchscreen area 101 by moving the insertion point to the location of the error (e.g., using the stylus 103), remove the mistake using the touchscreen area 102 (e.g., backspacing), then enter the correct character using the touchscreen area 102, and finally look at the touchscreen area 101 to ensure the mistake was corrected.

These problems limit the usability of the handwriting recognition system. Many users simply refuse to use the handwriting recognition. Many of those users that use it, do so only as a last resort.

Thus what is required is a solution for providing active feedback with regard to input strokes and recognized characters as text is being entered by a user. What is required is a solution that does not force a user to divert attention between two different touchscreen areas as text is being entered. What is further required is a solution that provides for in-place editing of recognized text. The present invention provides a novel solution to the above requirements.

SUMMARY OF THE INVENTION

The present invention provides a solution for providing active feedback with regard to input strokes and recognized characters as text is being entered by a user. The present invention provides a solution that does not force a user to divert attention between two different touchscreen areas as text is being entered. The present invention provides a solution that implements in-place editing of recognized text.

In one embodiment, the present invention is implemented as a computer implemented touch screen hand writing recognition user interface method for a hand-held computer system. The touchscreen user interface method can be implemented on a PID (personal information device) and can be implemented on a palmtop computer system. A first touchscreen area is provided for accepting text input strokes. A second touchscreen area is provided for displaying recognized text from the text input strokes. The text input strokes are displayed in the first touchscreen area. The text input strokes are recognized and the resulting recognized text is displayed in the second touchscreen area. A portion of the recognized text is displayed in the first touchscreen area, wherein the portion of the recognized text is shown as the text input strokes are recognized. The portion of the recognized text displayed scrolls as the new text input strokes are recognized. The portion of the recognized text in the first touchscreen area can be displayed in a different format with respect to the recognized text in the second touchscreen area. The text input strokes in a first part of the first touchscreen area are graphically shown as they are being recognized by the computer system.

BRIEF DESCRIPTION OF THE DRAWINGS

The present invention is illustrated by way of example and not by way of limitation in the Figures of the accompanying drawings, in which like reference numerals refer to similar elements, and in which.

Prior art

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing," "interpreting," "displaying," "configuring," "initializing," or the like, refer to the actions and processes of an embedded computer system, or similar embedded electronic computing device, that manipulates and transforms data represented as physical (electronic) quantities within the computer system's registers and memories into other data similarly represented as physical quantities within the computer system memories or registers or other such information storage, transmission or display devices.

The present invention is a computer implemented touch screen hand writing recognition user interface method. The present invention provides a solution for providing active feedback with regard to input strokes and recognized characters as text is being entered by a user. The present invention provides a solution that does not force a user to divert attention between two different touchscreen areas as text is being entered. The present invention provides a solution that implements in-place editing of recognized text. Embodiments of the present invention and its benefits are further described below.

It should be noted that the method and system of the present invention can be adapted to provide the user interface method for a number of different types of touchscreen equipped computing devices. Such devices include, for example, personal information devices (PIDs), palmtop computing devices, handheld cellular telephones (cellphones) and other types of mobile telephones, alphanumeric paging devices, and the like, which are equipped with, or coupled to, a touchscreen display.

Figure 2:
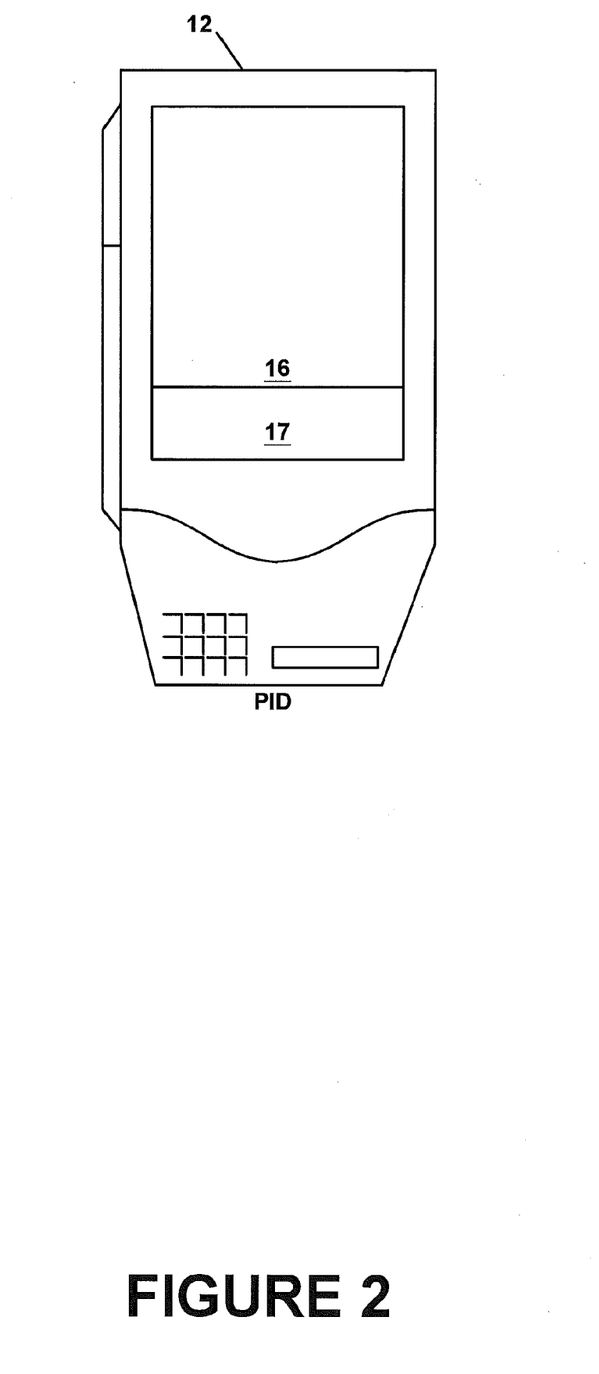
FIG. 2 shows an exemplary embodiment of a touchscreen equipped handheld PID configured to provide a touch screen hand writing recognition user interface in accordance with the present invention.

FIG. 2 shows an exemplary embodiment of a touchscreen equipped handheld PID 12 configured to provide a touch screen hand writing recognition user interface in accordance with the present invention. However, it should be noted that many touchscreen equipped electronic devices (e.g., digital cameras, pagers, palmtop computing devices, handheld cellular telephones (cellphones) and other types of mobile telephones, alphanumeric paging devices, and the like can be adapted to provide the hand writing recognition user interface functionality of the present invention. As depicted in FIG. 1, PID 12 includes a touchscreen 16 for accepting input from a user, such as, for example, when the user touches or strokes touchscreen 16 with a stylus.

Referring still to FIG. 2, in one embodiment, the present invention is realized as a computer implemented method of generating a touch screen hand writing recognition user interface for a computer system. The touchscreen user interface functions by accepting user input on touchscreen area 16 and a touch screen area 17 of PID 12. The touchscreen areas 16-17 are configured to register events and interpret the events as user input. As used herein, "events" refer to touches and/or strokes on the surface of touchscreen areas 16-17 of sufficient magnitude in order to be detected by the hardware comprising touchscreen areas 16-17. The hardware and software implementing the functionality of touchscreen areas 16-17 is configured for accepting text input strokes and for accepting icon manipulation strokes, such as, for example, where a user taps, strokes, etc., the surface of the touchscreen with a stylus. In implementing the user interface, PID 12 registers user input strokes on the touchscreen input area (i.e., touchscreen 16).

Figure 3:
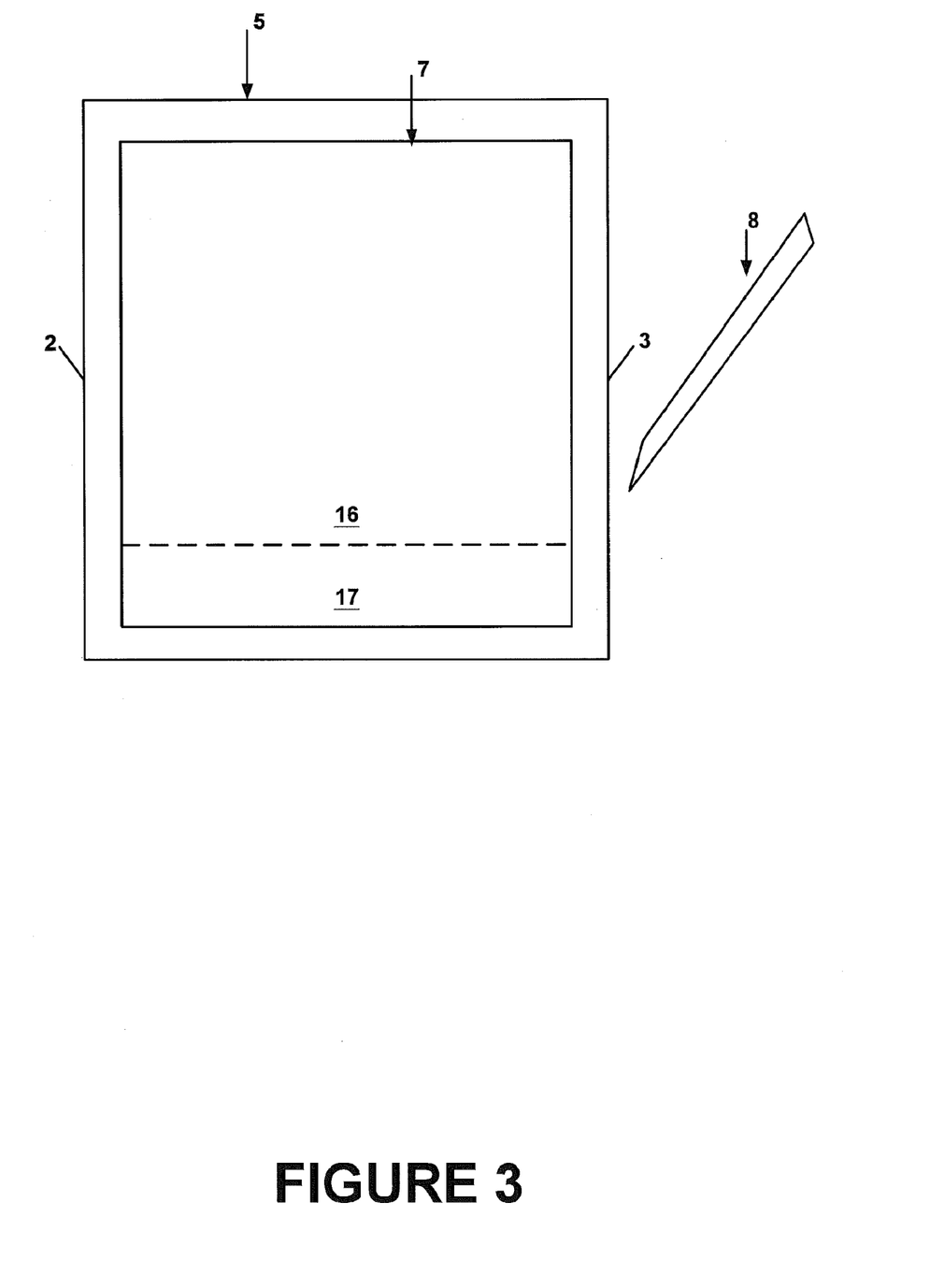
FIG. 3 shows a diagram of a PID in accordance with one embodiment of the present invention, wherein the size of the touchscreen display is maximized with respect to the overall size of the PID and stylus.

FIG. 3 shows a diagram of a PID 5 in accordance with a second embodiment of the present invention, wherein the size of the touchscreen display 7 is maximized with respect to the overall size of the PID 5 and stylus 8. In this embodiment, PID 5 utilizes a unified touchscreen display 7 having the first and second touchscreen areas 16-17. Touchscreen display 7 maximizes the amount of area of PID 5 dedicated to displaying a user interface by implementing areas 16-17 within a single touchscreen, thereby avoiding the requirement for inclusion of separate dedicated touchscreens for areas 16-17, thus making maximum use of the limited touchscreen size available for PIDs, palmtop computers, cellphones, and the like.

Figure 4:
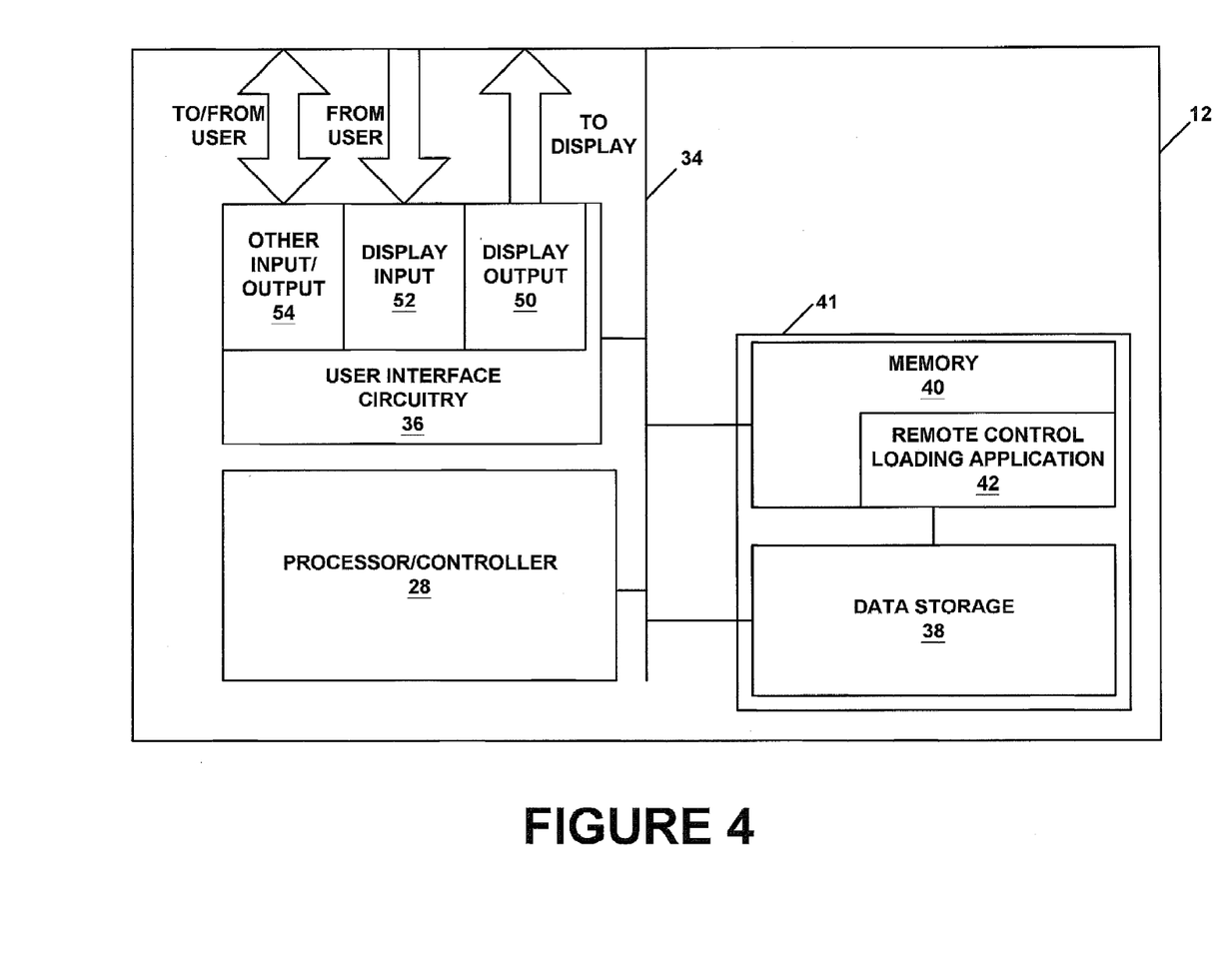
FIG. 4 is a function block diagram showing the components of an exemplary embodiment of the PID from FIG. 3.

FIG. 4 is a function block diagram showing the components of an exemplary embodiment of the PID 5. As depicted in FIG. 3, PID 5 includes a processor, or controller, 28 that is capable of executing software for controlling the functionality of touchscreen 7. Touchscreen 7 and sensors 2-3 communicate with data interface circuitry 26 through a bus 34. The processor 28 is also connected through the bus 34 to user interface circuitry 36, a data storage module 38 and memory 40. As used herein, the data storage module 38 and memory 40 may both generally be referred to as part of the PID memory 41.

The memory 40 may contain a specific remote control loading application 42. The remote control loading application 42 may operate, for example, after the processor 28 receives a user input touch commanding the loading of a certain software application (e.g., address book).

User interface circuitry 36 in the PID 5 includes hardware and software components that provide user input and output resources for functions in the processor 28. The user interface circuitry 36 includes display output 50, display input 52, and additional input/output interface circuitry 54.

The display output 50 preferably receives digital information representing graphical data from the processor 28 and converts the information to a graphical display, such as text and or/images, for display on touchscreen 7 (shown in FIG. 3). The display input 52 may receive data inputs, such as graphical data inputs, from a user of the PID 5. As described above, the graphical data inputs are preferably entered by the user with a stylus on touchscreen 7, and may include text, drawings, or other objects that are capable of being graphically presented.

Typically, the additional input/output interface 54 permits user input and commands to be input through buttons and similar devices on the PID, e.g., buttons for scrolling through data entries and activating applications. Alternatively, the input/output interface 54 may allow the PID 5 to accept audio data as well as other types of non-graphical data. For example, audio data signals (or picture telephone video input) may be entered through the additional input/output interface 54.

Figure 5:
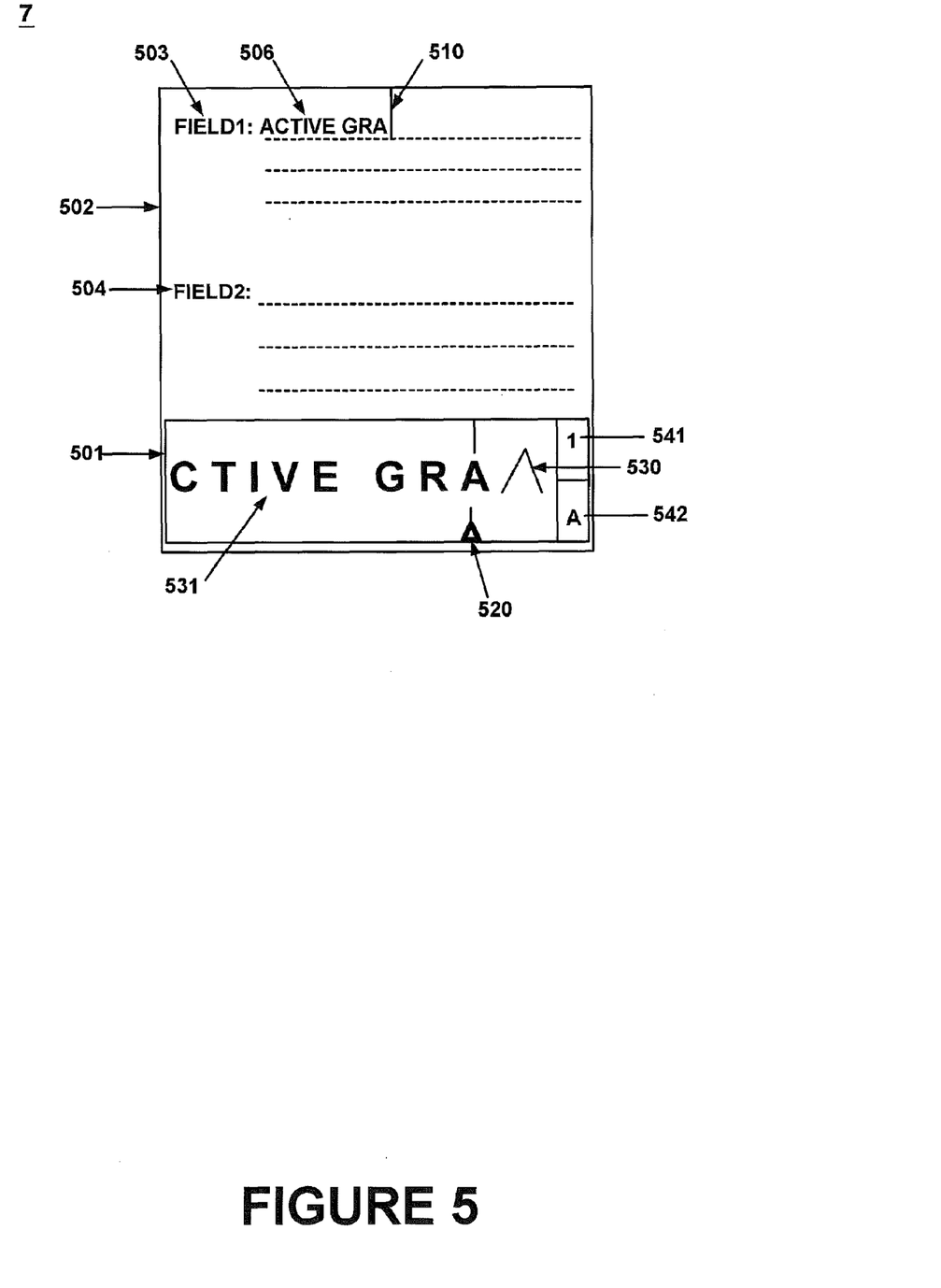
FIG. 5 shows a diagram of the user interface of the present invention as depicted on a touchscreen display of the PID from FIG. 3.

FIG. 5 shows a diagram of the user interface of the present invention as depicted on a touchscreen display 7 of the PID 5. As depicted in FIG. 5, the display 7 includes a first touchscreen area 501 and a second touchscreen area 502.

In this embodiment, touchscreen area 501 is configured for accepting text input strokes. Touchscreen area 502 is configured for displaying recognized text from the text input strokes. As depicted in FIG. 5, touchscreen area 502 shows a first field 503 and a second field 504. Recognized text 506 is also shown. The "current" text input stroke 530 is displayed in a first part of touchscreen area 501 to the right a scroll controller 520. Touchscreen area 501 shows a portion of the recognized text 531 in a second part of touchscreen area 501 to the left of a scroll controller 520.

In entering text, the text input strokes are successively entered (e.g., input stroke 530) by a user and are successively recognized. The resulting recognized text (e.g., recognized text 531) is displayed in the second part of touchscreen area 501 to the left of the scroll controller 520. The portion of the recognized text 531 corresponds to the recognized text shown in touchscreen area 502. The recognized text 531 shown in touchscreen area 501 scrolls to the left as new text input strokes are entered and new characters are recognized. In this manner, the scroll controller 520 and the insertion point 510 both scroll as new characters are entered by the user. As shown in FIG. 5, the recognized text 531 in touchscreen area 501 is rendered graphically in a larger font with larger spacing with respect to the recognized text 506 shown in touchscreen area 502. This aids in-place editing, wherein the user corrects mistakes by "writing" directly over the incorrect character in touchscreen area 501. A small font is used in touchscreen area 502 in order to display a larger amount of recognized text.

Draggable navigation of the recognized text in touchscreen area 502 is implemented, such that by dragging a boundary of the touchscreen area 501 (e.g., left or right edge, top or bottom edge) the user can change the portion of the recognized text shown in the first touchscreen area 501.

Draggable scrolling of the recognized text in touchscreen area 502 is implementing, such that by dragging the scroll controller 520 left or right, the text shown in touchscreen area 501 scrolls correspondingly to the left or the right. This can be used to control which portion of the recognized text shown in touchscreen area 502 is shown in touchscreen area 501.

To provide feedback to the user, the text input strokes in the touchscreen area 501 are graphically rendered (e.g., text input stroke 530) as they are being recognized by the computer system. For example, the text input stroke 530 is graphically rendered after having been entered by the user. The resulting recognized character is rendered directly above the scroll controller 520 and directly to the left of the insertion point 510. This provides visual feedback to the user, for example, allowing the user to correct subsequent input stroke technique to reduce recognition errors.

Referring still to FIG. 5, touchscreen area 501 includes a tab spot 541. Tab spot 541 functions by allowing the user to change the location of the text insertion point 510 with respect to, for example, the first field 503 and the second field 504. The user tapping the tab point 541 immediately jumps the insertion point 510 from, for example, the first field 503 to the second field 504. This aids the user in filling out electronic forms, etc. Additionally, touchscreen area 501 includes a caps spot 542. Caps spot 542 functions by allowing the user to change the case of the currently recognized character. For example, tapping on caps spot 542 allows the user to change the character at insertion point 510 from a lowercase "a" to an upper case "A" conveniently.

Figure 6:
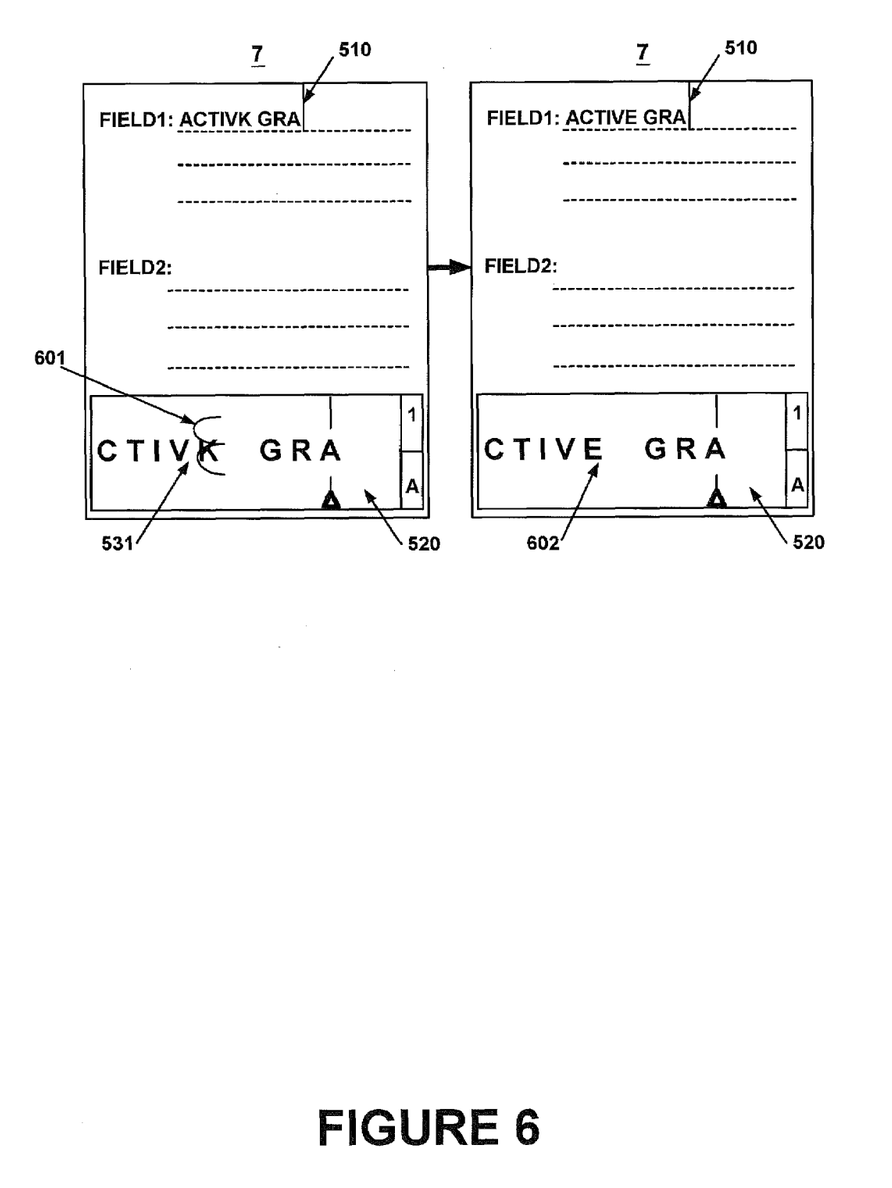
FIG. 6 shows diagrams depicting in-place editing in accordance with one embodiment of the present invention.

FIG. 6 shows diagrams depicting in-place editing in accordance with the present invention. The diagram of the left side of FIG. 6 shows the display 7 as an in-place edit is being made. The diagram on the right side of FIG. 6 shows the display 7 after the in-place edit has been made. Touchscreen area 501 implements in-place editing by replacing one or more previously recognized characters shown on the left hand side of scroll controller 520, in this case character 602, with newly recognized one or more characters. This is done by the user "writing" directly over the previously recognized one or more characters. This is shown in the left diagram by the text input stroke 601 being made directly over the character 602, a "k" in this case. The text input stroke 601 is subsequently recognized, as an "e" in this case, and replaces the previous character 602. This is shown in the right diagram. It should be noted that the insertion point 510 and the scroll controller 520 did not change their location. Writing over a recognized character replaces the character which the center of the text input stroke is closest to. This replacement does not alter the location of the insertion point 510.

Figure 7:
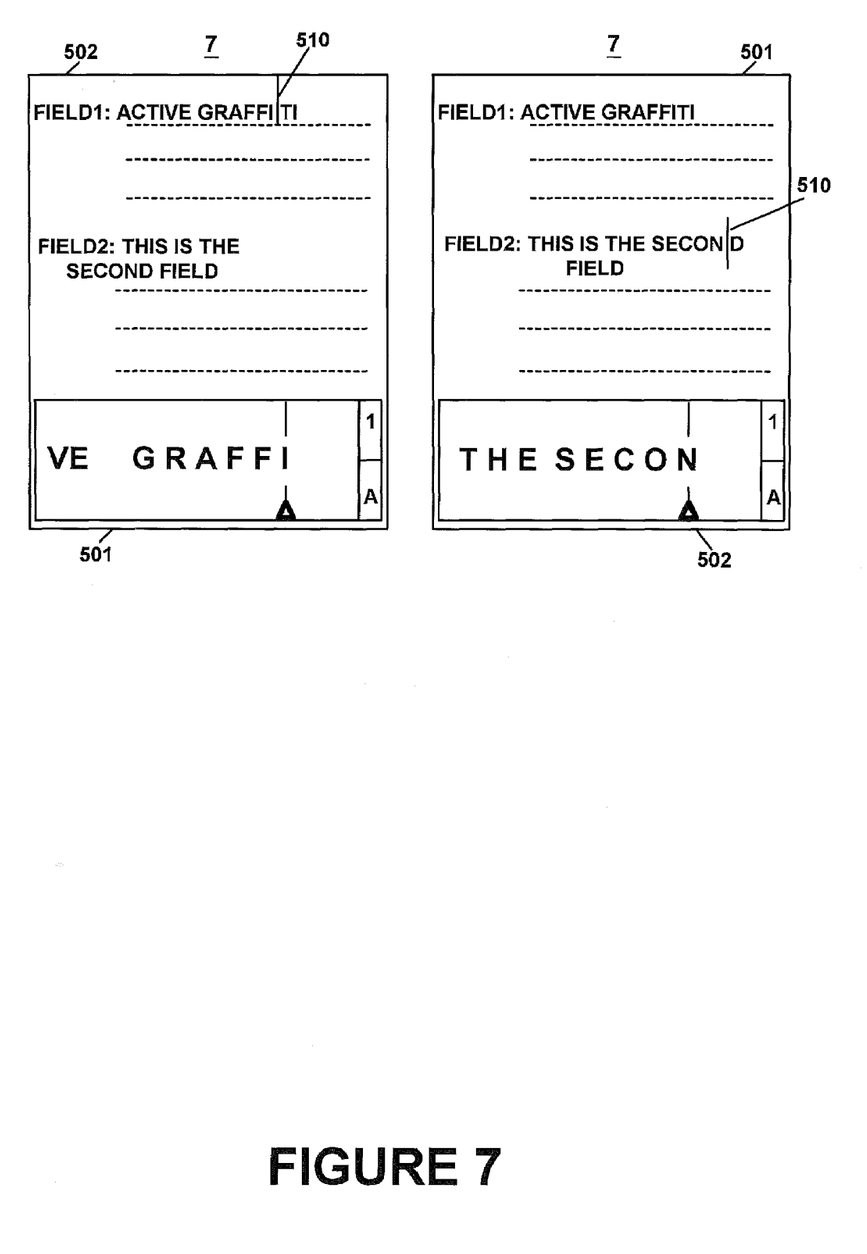
FIG. 7 shows diagrams depicting the coordination of the first touchscreen area, the scroll controller, and the insertion point in accordance with one embodiment of the present invention.

FIG. 7 shows diagrams depicting the coordination of the first touchscreen area 501, the scroll controller 520, and the insertion point 510. The diagram on the left of FIG. 7 shows insertion point 510 in the first field. The diagram on the right of FIG. 7 shows insertion point 510 in the second field. Thus, it should be noted that the "focus" of touchscreen area 501 follows the insertion point 510. While the characters displayed in touchscreen area 501 can be changed by, for example, draggable navigation or draggable scrolling, the characters displayed in touch in area 501 can also be change simply by moving the insertion point 510 within touchscreen area 502 (e.g., touching with a stylus).

Figure 8:
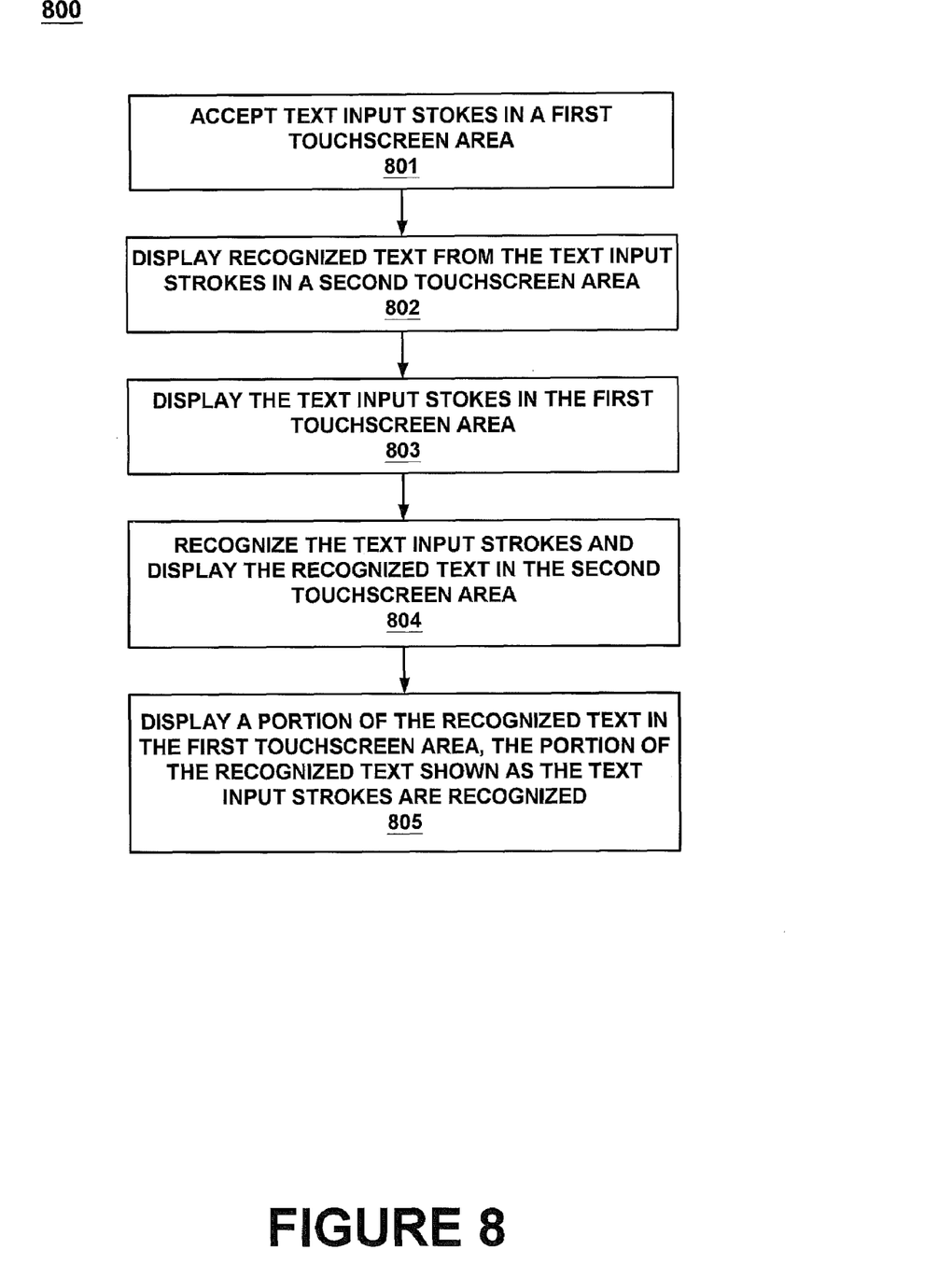
Referring now to FIG. 8, a flowchart of the steps of a handwriting recognition user interface process in accordance with one embodiment of the present invention is shown.

Referring now to FIG. 8, a flowchart of the steps of a process 800 in accordance with one embodiment of the present invention is shown. Process 800 shows the operating steps of the user interface method of the present invention as implemented on PID 5 of FIG. 3.

Process 800 begins in step 801 where text input strokes are accepted a first touchscreen area (e.g., touchscreen area 501) of PID 5. The first touchscreen area 501 is initialized to accept text input strokes from a user. In step 802, recognized text from the text input strokes are displayed in a second touchscreen area (e.g., touchscreen area 502). In step 803, the text input strokes are displayed as they are entered into touchscreen area 501 to provide feedback to the user with respect to character recognition. In step 804, text entry continues, with the recognizing of text input strokes and displaying of recognized text in touchscreen areas 501 and 502. As described above, touchscreen area 501 displays a recognition history of the most recently entered characters, and thus comprises a smaller portion of a larger amount of text displayed in touchscreen area 502. The text displayed in touchscreen area 501 can be changed via, for example, draggable navigation or draggable scrolling. In step 805, as text entry continues, the portion of the recognized text in touchscreen area 501 scrolls as new text input strokes are entered and recognized.

Thus, the present invention is a computer implemented touch screen hand writing recognition user interface method. The present invention provides a solution for providing active feedback with regard to input strokes and recognized characters as text is being entered by a user. The present invention provides a solution that does not force a user to divert attention between two different touchscreen areas as text is being entered. The present invention provides a solution that implements in-place editing of recognized text.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method of implementing a touchscreen user interface for an electronic system, the method comprising the steps of:
   accepting text input strokes in a first touchscreen area at an insertion point in a second touchscreen, said first touchscreen area configured for recognizing input strokes as text input;
   displaying recognized text from the text input strokes in said second touchscreen area at a scroll control area, said second touchscreen area configured for recognizing input strokes as command strokes;
   displaying the text input strokes in the first touchscreen area as the strokes are made;
   recognizing the text input strokes and displaying recognized text in the second touchscreen area, said recognized text comprising a recognition history;
   displaying a portion of the recognized text in the first touchscreen area, the portion of the recognized text shown as the text input strokes are recognized;
   scrolling the portion of the recognized text in said first area and scrolling said second area in a simultaneous manner as new text input strokes are recognized to accommodate new input characters;
   changing the recognized text in said first touchscreen area, where said text is selected by dragging a boundary around said text within said first touchscreen area, in performing said change, editing said recognition history, so that it reflects the resulting string after editing;
   implementing a draggable scroll controller within the first touchscreen area for scrolling the portion of the recognized text displayed in said first touchscreen area, navigating said recognition history; and
   implementing in-place editing by replacing one or more previously recognized characters of the portion of the recognized text in the first touchscreen area with newly recognized one or more characters by recognizing new text input strokes made over the one or more previously recognized characters, in performing said editing, editing said recognition history, so that it reflects the resulting string after editing.

2. The method of claim 1 further including the step of scrolling the portion of the recognized text in the first touchscreen area as new text input strokes are recognized.

3. The method of claim 1 further including the steps of:
displaying the portion of the recognized text in the first touchscreen area in a first format; and
displaying the recognized text in the second touchscreen area in a second format, wherein the first format is larger than the second format.

4. The method of claim 1 further including the steps of:
displaying the text input strokes in a first part of the first touchscreen area;
displaying the portion of the recognized text in a second part of the first touchscreen area, wherein the text input strokes are shown in the first part until the text input strokes are recognized and resulting recognized text is shown in the second part.

5. The method of claim 1 further including the step of:
implementing draggable navigation of the recognized text in the second touchscreen area by dragging a boundary of the first touchscreen area to change the portion of the recognized text shown in the first touchscreen area.

6. The method of claim 1 further including the step of:
implementing tab spots in the first touchscreen area to change a location of a text entry point with respect to a plurality of fields of the second touchscreen area.

7. The method of claim 1 wherein the step of recognizing the text input strokes includes immediately recognizing a character after a user completes at least one stroke that defines the character.

8. The method of claim 1 wherein the touchscreen area is provided on a PID (personal information device).

9. The method of claim 1 wherein the touchscreen area is provided on a palmtop computer system.

10. The method of claim 1 where said recognition history is a file being edited or created.

11. In a portable electronic system, a method of implementing a user interface for electronic system, the method comprising the steps of:
accepting text input strokes in a first area at an insertion point, said first area configured for recognizing input strokes as text input;
displaying recognized text from the text input strokes in a second area at a scroll control area, said second area configured for recognizing input strokes as command strokes, said recognized text comprising a recognition history;
displaying the text input strokes in the first area as they are stroked;
recognizing the text input strokes and displaying recognized text in said second area;
displaying a portion of the recognized text in the first area, the portion of the recognized text shown as the text input strokes are recognized;
scrolling the portion of the recognized text in said first area and scrolling said second area in a simultaneous manner as new text input strokes are recognized to accommodate new input characters;
changing the recognized text in said first area, where said text is selected by dragging a boundary around said text within said first area, in performing said change, editing said recognition history, so that it reflects the resulting string after editing;
implementing a draggable scroll controller within the first area for scrolling the portion of the recognized text displayed in said first area, navigating said recognition history; and
implementing in-place editing by replacing one or more previously recognized characters of the portion of the recognized text in the first area with newly recognized one or more characters by recognizing new text input strokes made over the one or more previously recognized characters, in performing said editing, editing said recognition history, so that it reflects the resulting string after editing.

12. The method of claim 11 further including the steps of:
displaying the portion of the recognized text in the first area in a first format; and
displaying the recognized text in the second area in a second format, wherein the first format is larger than the second format.

13. The method of claim 11 further including the steps of:
displaying the text input strokes in a first part of the first area;
displaying the portion of the recognized text in a second part of the first area, wherein the text input strokes are shown in the first part until the text input strokes are recognized and resulting recognized text is shown in the second part.

14. The method of claim 11 further including the step of:
implementing draggable navigation of the recognized text in the second area by dragging a boundary of the first area to change the portion of the recognized text shown in the first area.

15. The method of claim 11 further including the step of:
implementing tab spots in the first area to change a location of a text entry point with respect to a plurality of fields of the second area.

16. The method of claim 11 wherein a first touchscreen display is used to implement the first area and a second touchscreen is used implement the second area.

17. The method of claim 16 where through said first touch screen a point may be selected to insert text, where said second screen advances entry point to correspond to said point in said recognition history.

18. The method of claim 11 wherein a single touchscreen display is used to implement the first area and the second area.

19. The method of claim 11 where said recognition history is a file being edited or created.

20. The method of claim 19 where through said second area a point may be selected to insert text, where said first area advances said entry point to correspond to said point in said recognition history.

\* \* \* \* \*